(12) United States Patent
Moates (10) Patent No.: US 7,100,873 B2
(45) Date of Patent: Sep. 5, 2006

(54) HANGER ASSEMBLY FOR AIRCRAFT

(75) Inventor: James Benjamin Moates, Destin, FL (US)

(73) Assignee: DRS Training & Control Systems, Inc., Ft. Walton Beach, FL (US)

( * ) Notice: Subject to any disclaimer, the term of this patent is extended or adjusted under 35 U.S.C. 154(b) by 397 days.

(21) Appl. No.: 10/797,681

(22) Filed: Mar. 5, 2004

(65) Prior Publication Data

US 2004/0262456 A1  Dec. 30, 2004

Related U.S. Application Data

(60) Provisional application No. 60/452,118, filed on Mar. 6, 2003.

(51) Int. Cl.
*B64D 1/12* (2006.01)

(52) U.S. Cl. ........................................ 244/137.4; 24/285

(58) Field of Classification Search ............ 244/137.1, 244/137.4; 24/279, 284, 285, 286
See application file for complete search history.

(56) References Cited

U.S. PATENT DOCUMENTS

| | | | |
|---|---|---|---|
| 2,393,105 A | 1/1946 | Hasselhorn | |
| 2,462,744 A | 2/1949 | Hasselhorn | |
| 2,786,392 A | 3/1957 | Niedling | |
| 2,833,494 A * | 5/1958 | Parker et al. ................. | 244/63 |
| 2,896,509 A * | 7/1959 | Musgrave .................... | 89/1.51 |
| 3,146,668 A | 9/1964 | Wagenseller | |
| 3,228,192 A | 1/1966 | Kossan et al. | |
| 3,276,317 A | 10/1966 | Kossan et al. | |
| 3,357,432 A * | 12/1967 | Sparks ........................ | 606/151 |
| 3,367,233 A * | 2/1968 | Silverschotz ................ | 89/1.51 |
| 3,468,215 A | 9/1969 | Alpert | |
| 3,771,412 A | 11/1973 | Lebovitz | |
| 3,967,529 A | 7/1976 | Ingle et al. | |
| 4,155,286 A | 5/1979 | Mihm | |
| 4,204,456 A | 5/1980 | Ward | |
| 4,257,567 A | 3/1981 | Hasquenoph et al. | |
| 4,417,709 A | 11/1983 | Fehrm | |
| 4,448,373 A * | 5/1984 | Bates et al. ............... | 244/137.4 |
| 4,545,284 A | 10/1985 | Piesik | |
| 4,660,456 A | 4/1987 | Griffin et al. | |
| 4,711,151 A | 12/1987 | Griffin et al. | |
| 4,714,229 A * | 12/1987 | Force et al. ................ | 248/610 |
| 4,732,074 A | 3/1988 | Normand | |
| 4,745,840 A | 5/1988 | Long | |
| 4,750,404 A | 6/1988 | Dale | |
| 4,802,641 A * | 2/1989 | Hardy et al. ............. | 244/137.4 |

(Continued)

FOREIGN PATENT DOCUMENTS

DE        4321379        1/1995

(Continued)

*Primary Examiner*—Peter M. Poon
*Assistant Examiner*—Timothy D. Collins
(74) *Attorney, Agent, or Firm*—Norris,McLaughlin & Marcus (57) ABSTRACT

A hanger assembly for suspending an external store from an aircraft includes left and right side panels in hinged connection to a center panel, where the panels, in combination, form a band for substantially circumferentially surrounding the external store. The center panel includes an interface for engagement with an attachment pod on an aircraft, and the side panels are fastened in tension to each other diametrically opposite the interface. The length, thickness and material strength of the band are selected to minimize the bending moment, which is induced in the hanger assembly based on loading experienced during operational use, at a region of the band at which an interface is established with the aircraft.

9 Claims, 7 Drawing Sheets

U.S. PATENT DOCUMENTS

| | | |
|---|---|---|
| 4,926,740 A | 5/1990 | Griffin et al. |
| 4,976,183 A | 12/1990 | Norrvi et al. |
| 5,172,873 A | 12/1992 | Lum |
| 5,406,876 A * | 4/1995 | Harless et al. ............... 89/1.54 |
| 5,497,691 A | 3/1996 | Graham |
| 5,831,200 A | 11/1998 | Fisch |
| 5,970,842 A | 10/1999 | Knapp et al. |
| 6,408,762 B1 | 6/2002 | Schmacker et al. |
| 6,543,328 B1 | 4/2003 | Plummer et al. |

FOREIGN PATENT DOCUMENTS

| | | |
|---|---|---|
| JP | 8121995 | 5/1996 |

* cited by examiner

HANGER ASSEMBLY FOR AIRCRAFT

CROSS REFERENCE TO RELATED APPLICATION

This application claims the benefit of U.S. Provisional Application No. 60/452,118 filed Mar. 6, 2003, assigned to the assignee of this application and incorporated by reference herein.

FIELD OF THE INVENTION

The present invention generally relates to a hanger assembly for use on aircraft, and more particularly, a hanger assembly for use on aircraft which minimizes loading at the portion of the hanger assembly that interfaces with the aircraft and which stiffens the casing of an external store, such as a missile or instrumentation pod, that the hangar assembly couples to the aircraft.

BACKGROUND OF THE INVENTION

Various hanger assemblies for suspending an external store from aircraft exist in the prior art. These hanger assemblies are used, for example, to suspend aerial missiles, which are released while an aircraft is in flight, or, alternatively, suspend instrumentation pods, which generally are maintained fixed to the aircraft for indefinite periods.

A hanger assembly for suspending a missile to be launched from aircraft often includes a T-shaped hanger member which functions as the mechanical interface between the hanger assembly and a launcher mechanism fixed to an aircraft. In the prior art, the T-shaped member is attached directly to, or to a thin narrow strap that is clamped around, the external casing of the missile, and is configured to slide along a guiding rail of the launcher. See, for example, U.S. Pat. Nos. 2,393,105 and 5,970,842, incorporated by reference herein.

It is well known that a hanger assembly is subjected to heavy wear during use. The weight of a suspended external store itself, which can be substantial in the case of missiles, applies a load upon the hanger assembly, particularly at the region of the hanger assembly including the mechanical interface. Further, aerodynamic loading on the external store, which can be caused by vibration, shock and wind shear during flight, in combination with the weight of the suspended store, applies a heavy load upon the hanger assembly. If the loading on the hanger assembly is severe enough, the member establishing a mechanical interface with the aircraft can bend or deflect, which can result in failure of the entire hanger assembly.

In addition, the loading that can occur during operational use of the hanger assembly can apply stress to the casing of an external store, which in turn can cause the store, such as an instrumentation pod or a missile, to break in half and fall off or hit the wing of the aircraft. In many military applications of prior art hanger assemblies, it has been found that a hanger assembly which is bolted directly onto a missile does not provide the casing of the missile with adequate stiffness to avoid failure of the casing at the region associated with the hanger assembly.

Several prior art hanger assemblies are in the form of a band having an aperture through which an electrical connection between the external store and the aircraft can be established. For these hanger assemblies, the repetitive vibration and shock occurring during operational use generates stresses at the region of the band where the aperture is defined, which sometimes can result in failure of the band at such region.

Failure of a hanger assembly or an attached external store during flight in a military aircraft application is highly undesirable, because of the potential of damage to the military aircraft and of the adverse affect on the ability of the aircraft to counter an enemy aircraft.

Therefore, a need exists for a hanger assembly for use on an aircraft which is easy to manufacture and use, provides for flexible use among various types and sizes of external stores, reduces loading at a region of the hanger assembly that interfaces with the aircraft and reduces loading upon the casing of an external store suspended by the hanger assembly.

SUMMARY OF THE INVENTION

In accordance with the present invention, a hanger assembly for suspending an external store from an aircraft includes a band for substantially circumferentially surrounding the external store, where the band can be adjustably fastened to the store to apply a desired radial loading to the external casing of the store and where the band has a construction that minimizes the effects of loading on the hanger assembly at a region of the band that interfaces with the aircraft. The band includes an arcuate center panel which at each end is in hinged connection to an arcuate side panel. The center panel has a mechanical interface preferably including a T-shaped hanger member for engaging a rail of an attachment pod of the aircraft, such as a launcher mechanism. The side panels have respective free ends distal the hinged portion. The band is secured to the external store by fasteners that fasten the free ends of the side panels to each other at a point diametrically opposite to the T-shaped hanger member. When the band is secured to the external store by the fasteners, each of the panels extends through approximately 120 degrees of the circumference of the external store.

In a preferred embodiment, the hanger assembly has a longitudinal length and a thickness, and is manufactured of sufficiently high strength materials, to provide that, during operational use, a bending moment caused by loading on the hanger assembly is low at the region of the hanger assembly at which a mechanical interface is established with the aircraft.

In a further preferred embodiment, the center panel defines an aperture through which a hardware interface can be established between the external store and the aircraft. The hanger assembly has a sufficient longitudinal length and thickness, and is manufactured of sufficiently high strength materials, to provide that, during operational use, a bending moment caused by loading on the hanger assembly is low at the region of the hanger assembly defining the aperture and also at the region establishing a mechanical interface with the aircraft.

BRIEF DESCRIPTION OF THE DRAWINGS

Other objects and advantages of the present invention will be apparent from the following detailed description of the presently preferred embodiments, which description should be considered in conjunction with the accompanying drawings in which like references indicate similar elements and in which.

DETAILED DESCRIPTION OF PREFERRED EMBODIMENTS

For purposes of highlighting the features of the present inventive hanger assembly, the hanger assembly is described below in connection with its use in suspending a missile from an aircraft. It is to be understood, however, that the inventive hanger assembly can be used to suspend various external stores, such as an instrumentation pod, from various locations of an aircraft in accordance with the present invention.

Figure 1:
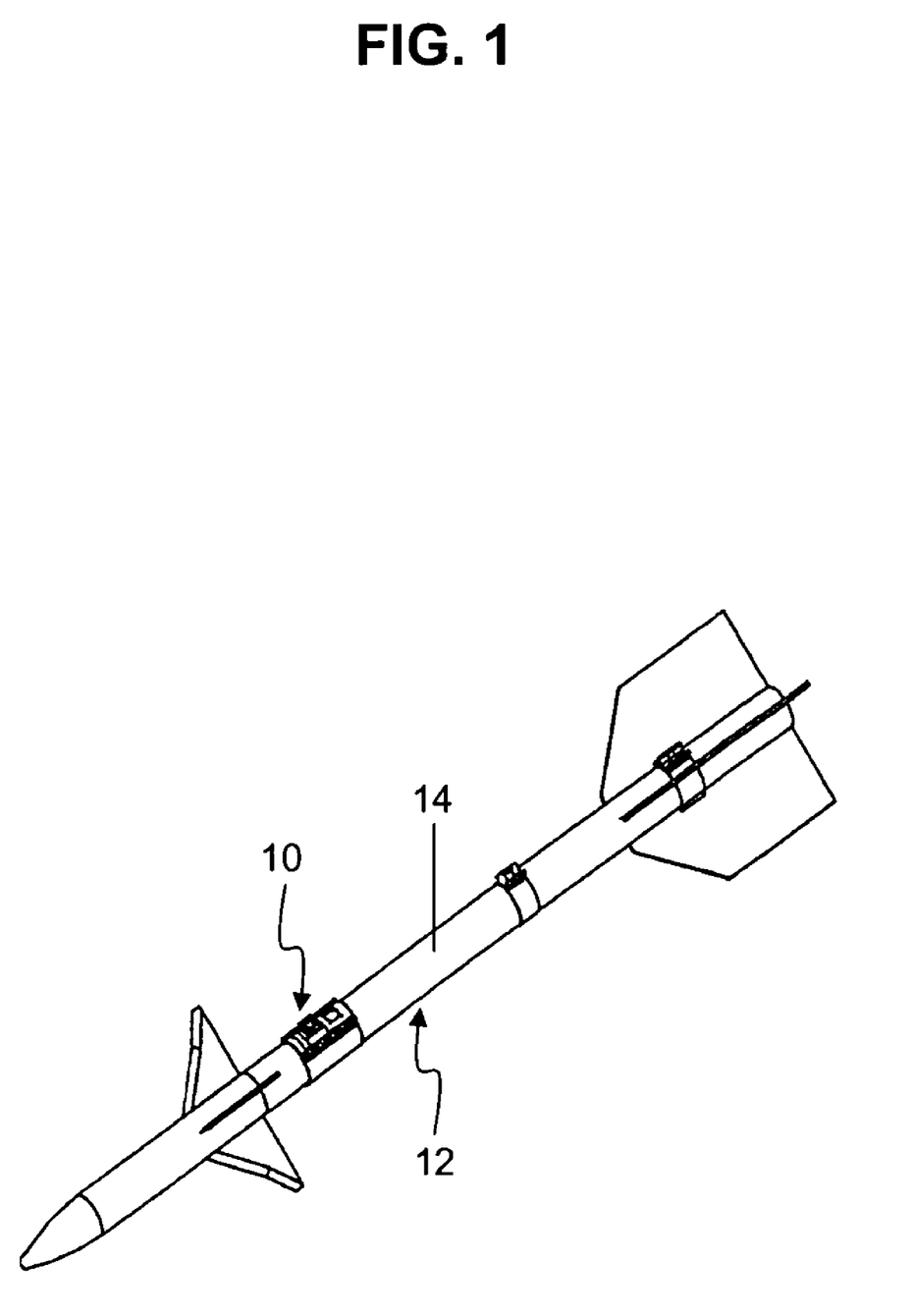
FIG. 1 is a perspective view of a missile having attached thereto a hanger assembly in accordance with the present invention.
Figure 2A:
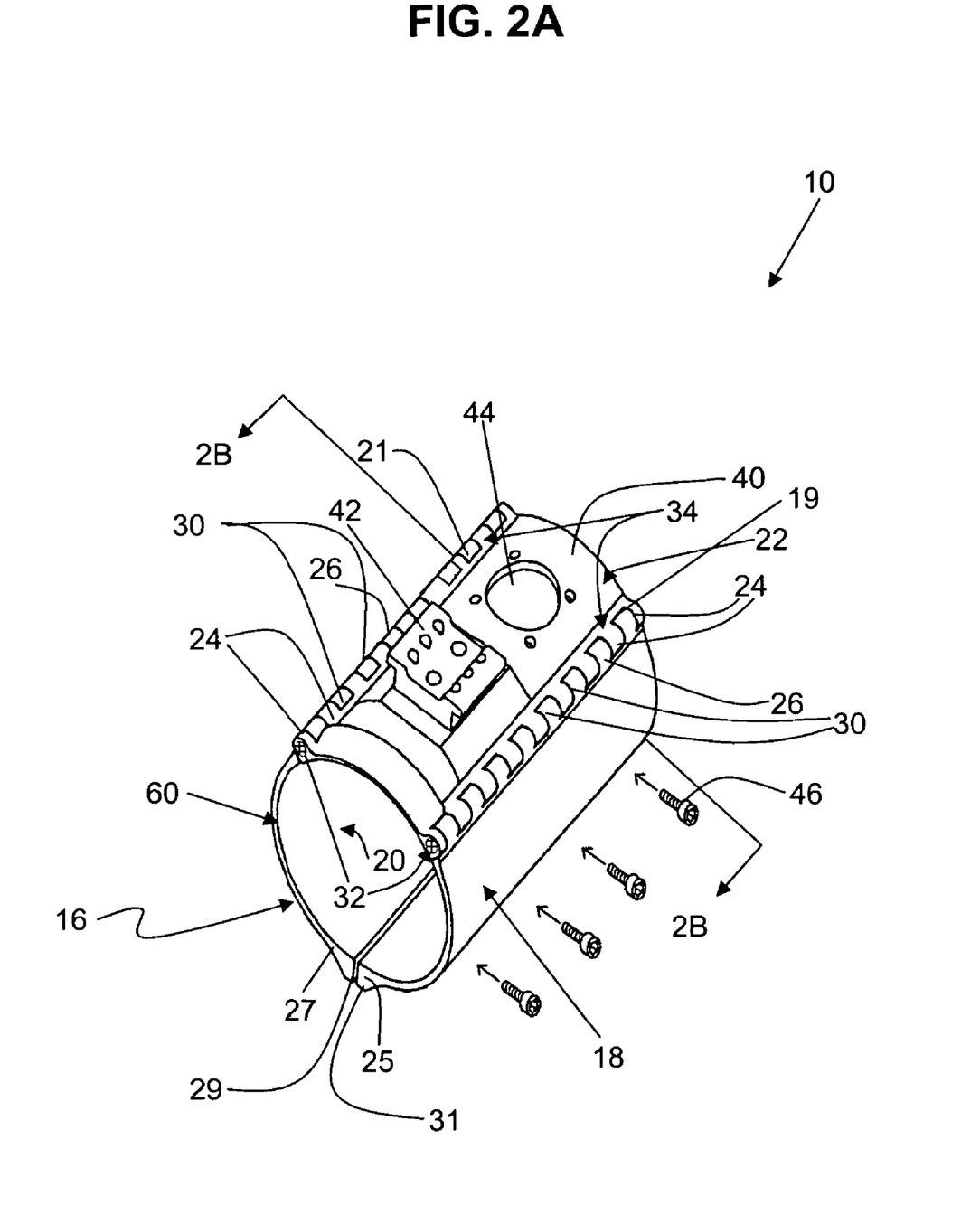
FIG. 2A is a perspective view of a preferred embodiment of the hanger assembly of FIG. 1.

FIG. 1 shows a preferred embodiment of a hanger assembly 10, in accordance with present invention, secured to a missile 12 having an external casing 14. Referring to FIG. 2A, which shows a detailed perspective view of only the hanger assembly 10, and FIG. 2B, which shows a cross-sectional view of the hanger assembly 10, the hanger assembly 10 includes a band 16 including arcuate right and left side panels 18 and 20, respectively, and an arcuate center panel 22. Each of the panels 18, 20 and 22 extends through approximately 120 degrees. When the band 16 is clamped around an external store, such as a missile as discussed below in the text accompanying the description of FIGS. 3A, 3B, 4A and 4B, the band 16 substantially circumferentially surrounds the missile.

Figure 2B:
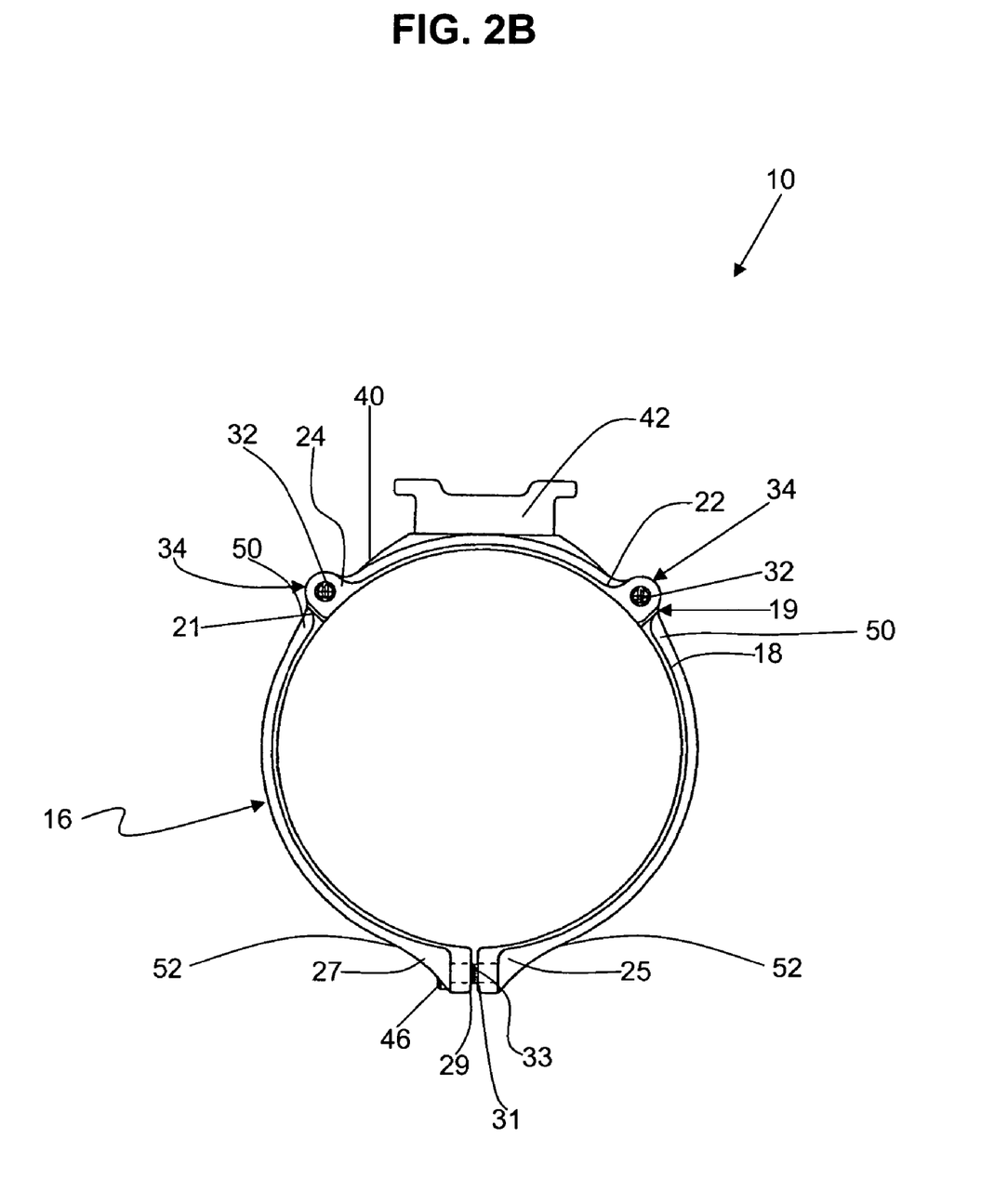
FIG. 2B is a cross-sectional view of the hanger assembly of FIG. 2A.

The center panel 22 includes conventional hinge loops 24 at each opposing end 26. The panels 18 and 20 includes conventional hinge loops 30 at ends 19 and 21, respectively. The hinge loops 30 at the ends 19 and 21 are configured for mating with the hinge loops 24 of the center panel 22 at the respective ends 26. A hinge pin 32 extends through each of the mated loops 24 and 30 to create a hinged joint 34.

The side panels 18 and 20 include free ends 25 and 27, respectively, distal from the hinged ends 19 and 21. The free ends 25 and 27 include flanges 29 and 31, respectively, where each of the flanges 29 and 31 includes threaded apertures 33. The apertures 33 are positioned in the flange 29 to be aligned with corresponding apertures 33 in the flange 31 when the side panels 18 and 20 are rotated about the hinge joints 34 toward each other so as to define, in combination with the center panel 22, a circularly shaped band 16. Fasteners 46, such as a threaded bolt or screw, extend through the aligned apertures 33 and secure the free ends 25 and 27 of the side panels 18 and 20, respectively, to each other. In a preferred embodiment, each of the flanges 29 and 31 includes eight apertures 33.

The center panel 22 has an outer surface 40 including a mechanical interface member 42 that is in the form of a T-shaped hanger member, which, as well known and conventional in the art, is for coupling to a rail guide of a launcher on an aircraft. The center panel 22 optionally defines an aperture 44 interposed between the ends 26. The aperture 44 is a hardware interface through which cabling, such as electrical or optical cabling, extending from the aircraft can be coupled to an external store that is suspended by the hanger assembly 10. In a preferred embodiment, the aperture 44 is substantially circular in shape, has a diameter of about 1.5 inches, is longitudinally aligned on the surface 40 with the mechanical interface member 42 and has a center that is about 1.8 inches away from the nearest edge of the mechanical interface member 42.

In the preferred illustrated embodiment, as shown in FIG. 2B, each of the side panels 18 and 20 has a leading edge portion 50 at the hinge joint 34 and a trailing edge portion 52 at the end distal to the hinge joint 34, which provide the band 16 with a conformal profile that functions to reduce drag during use. For example, the leading edges 50 and 52 are about 0.267 inches thick, whereas each of the side panels 18 and 20 is about 0.190 inches thick at all other portions.

In a further preferred embodiment, the side panels 18 and 20 and the center panel 22 have a nominal thickness of between about 0.190 and 0.375 inches and the longitudinal length of the band 16 is between about 8 and 15 inches. In addition, the T-shaped member 42 preferably extends, on the outer surface 40 of the band 16, about 1.75 inches in the lengthwise direction and about 2.26 inches in the transverse direction.

In still a further preferred embodiment, the T-shaped member 42 is manufactured from a very high strength percipation hardening or maraging steel, and the fasteners 46 are also manufactured from a very high strength material. In another preferred embodiment, all of the components of the hanger assembly 10 are manufactured from high strength materials. In still a further preferred embodiment, the T-shaped member 42 and the center panel 22 are an integral structure.

Referring to FIGS. 1, 2A and 2B, in operational use of the hanger assembly 10, the center panel 22 of the band 16 is placed onto a selected portion of the external casing 14 of the missile 12. The side panels 18 and 20 are then pivoted about the hinge joints 34 toward the missile 12, so that the flanges 29 and 31 oppose each other and their respective apertures 33 are aligned. The fasteners 46, such as threaded screws, are threaded through the aligned sets of the apertures 33 to secure the panels 18 and 20 to each other. The band 16, thus, is clamped substantially around the circumference of the missile 12.

In a preferred embodiment, the band 16 is secured around the casing 14 of the missile 12 by applying about 40–50 in-lb of torque to the fastener screws 46. By applying a suitable amount of torque to the fasteners 46 when securing the band 16 to the missile 12, the hinged joints 34 are placed in tension, which in turn applies a radial load or compressive hoop stress around the missile casing 14. This radial loading minimizes rotation of the missile 12 within the hanger band 16 during operational use. In addition, the radial loading provides a local stiffness EI to the casing 14 of the missile 12, where I is the area moment of inertia and E is the Young's Modulus ($29$–$30 \times 10^6$ psi). In a preferred embodiment where the missile 12 has a 5 inch diameter and weighs about 190 lbs, the fasteners 46 are torqued to provide a stiffness between about $450 \times 10^6$ and $600 \times 10^6$ lb-in$^2$, which avoids a failure in the region of the casing 14 about which the band 16 circumferentially surrounds the missile 12.

During operational use, the hanger assembly 10 is subjected to loading stresses resulting from the weight of the missile 12 itself and aerodynamic loading resulting from, for example, vibration and shock. In accordance with the present invention, the band 16 is configured to have a longitudinal length, a thickness and a high strength material composition, and also the capability of being clamped with tension around the casing 14 so as to supply a predetermined local stiffness to the casing 14, to provide that a bending moment on the hanger assembly 10, which can be induced from the loading stresses, is at a minimum in the region of an interface with the aircraft, such as the region of the T-shaped hanger member 42 and any optional aperture 44, and at a maximum, for example, near front edge 60 of the assembly 10. This positioning of the induced bending moment avoids deflection and stress in the casing 14 of the missile 12 and at an interface with the aircraft, such as at region of the T-shaped hanger member 42 and any optional aperture 44.

In a preferred embodiment, the panels 18, 20 and 22 are of a combined length that is about equal to the circumference of a conventional 5 inch diameter missile casing. It is to be understood that the panels 18, 20 and 22 can be manufactured to have any desired length, in accordance with the present invention, to match the circumference of a specific casing to be suspended by the hanger assembly 10.

Figure 3A:
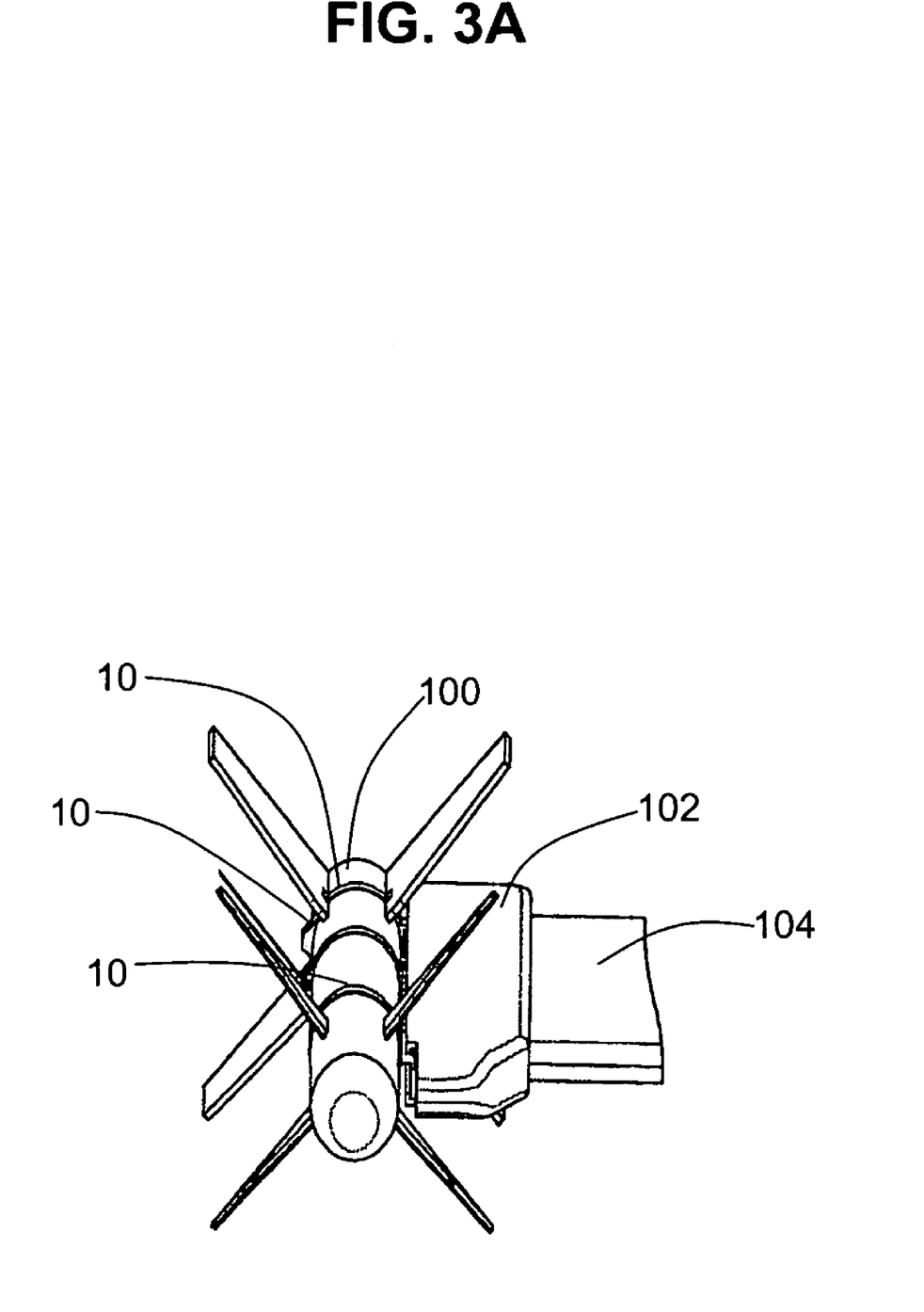
FIGS. 3A and 3B are perspective views of a missile/instrumentation pod attached to a wingtip launcher of an aircraft by the hanger assembly of the present invention.
Figure 3B:
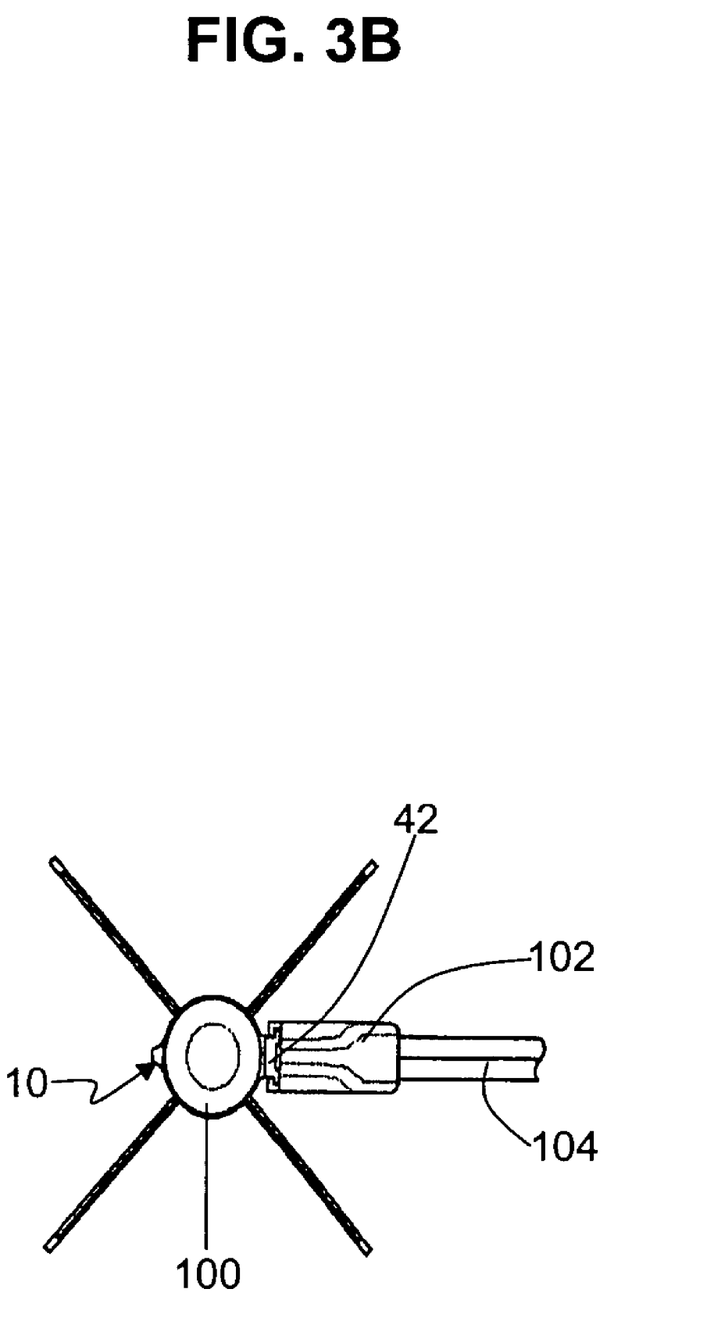

Referring to FIGS. 3A and 3B, in a preferred embodiment, several hanger assemblies 10 are clamped around an AIM-9 missile 100. The T-shaped member 42 of each of the hanger assemblies 10 is removably engaged on a launch rail of a launcher 102. The launcher 102 is bolted to a wing tip 104 of an aircraft (not shown) and provides the mechanical and electrical interface to the missile 10. Conventional launcher detents (not shown) lock the missile 100 in place while removably attaching the missile 100 to the launcher 102. In operation, when the missile 100 is fired, the T shaped member 42 slides down the launch rail as the missile accelerates from the launcher 102.

Figure 4A:
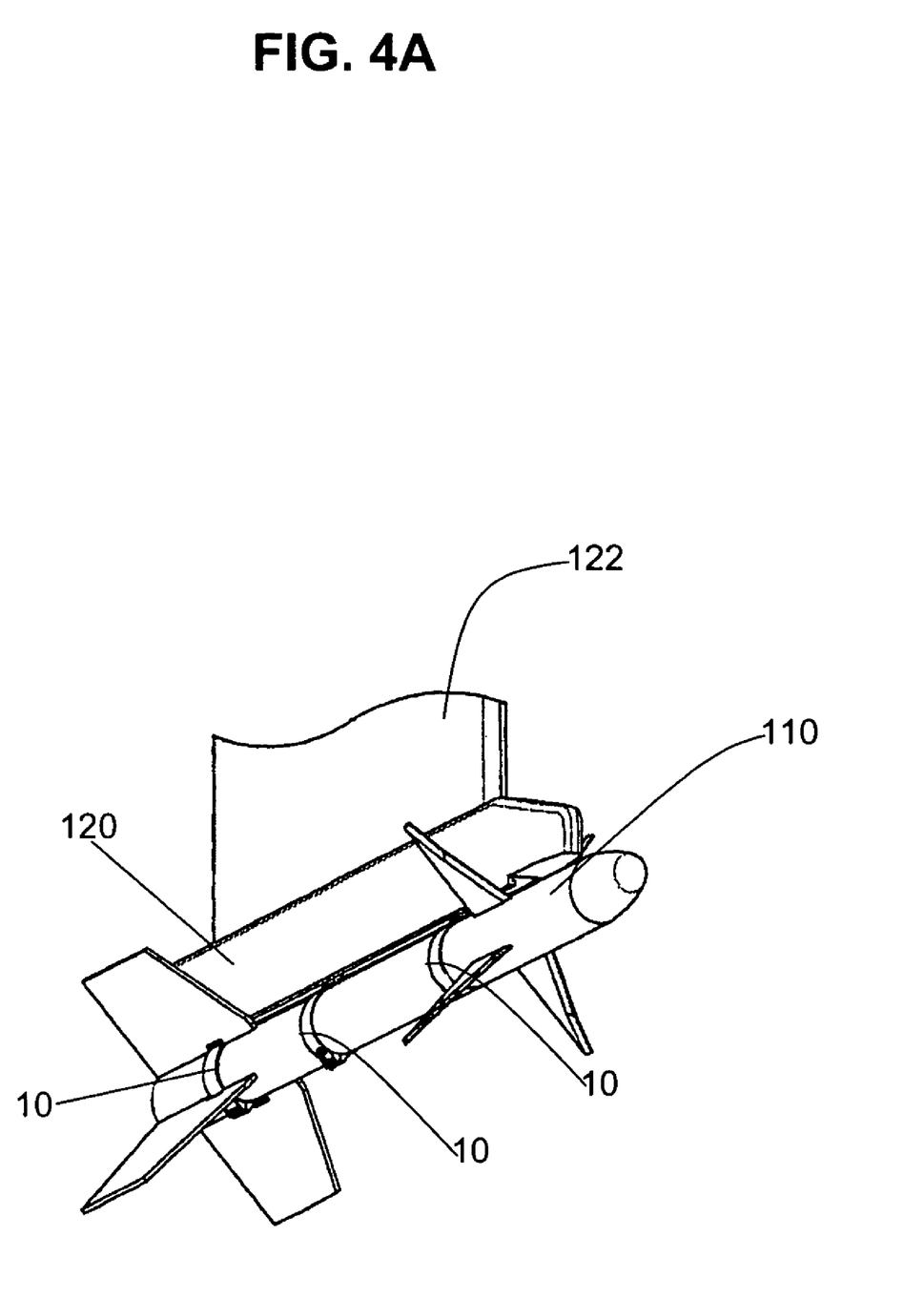
FIGS. 4A and 4B are perspective views of a missile/instrumentation pod attached to a wing pylon launcher of an aircraft by the hanger assembly of the present invention.
Figure 4B:
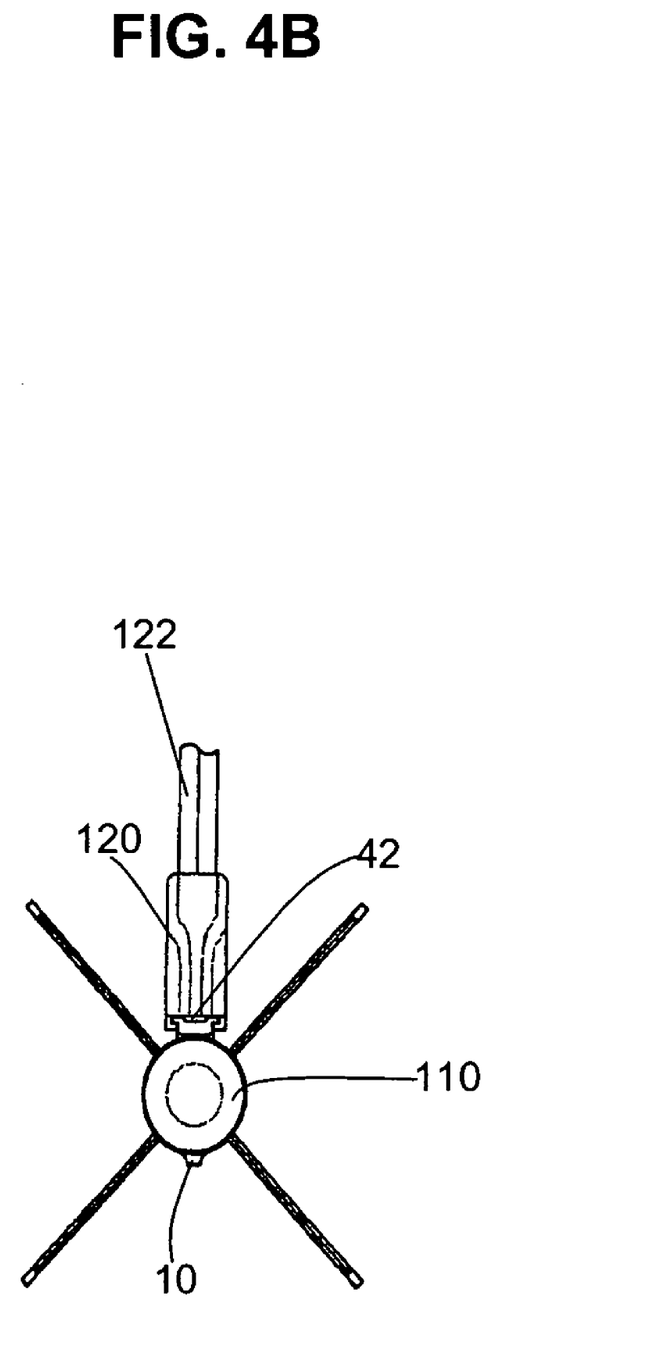

Referring to FIGS. 4A and 4B, in a preferred embodiment, hanger assemblies 10 are secured to an AIM-9 missile 110 which is mounted to a launcher 120 bolted to a pylon 122 of an aircraft (not shown). The launcher 120 includes an aperture (not shown) which would be aligned with the aperture 44 of the hanger assembly 10 and through which an electrical interface can be established with the missile 10.

Although preferred embodiments of the present invention have been described and illustrated, it will be apparent to those skilled in the art that various modifications may be made without departing from the principles of the invention.

What is claimed is:

1. A hanger assembly for suspending an external store from an aircraft comprising:
   a band for coupling to an external store and including an arcuate center panel having first and second ends and outer and inner arcuate surfaces, wherein the band further includes first and second arcuate side panels each having first and second ends, wherein the first end of the center panel is in hinged connection to the first end of the first side panel and the second end of the center panel is in hinged connection to the first end of the second panel, wherein the outer surface of the center panel includes an interface for engagement with an attachment mechanism of an aircraft, wherein the side panels are rotatable at the hinged connection to place the band in a substantially circular configuration where the second ends of the first and second panels face each other and are substantially diametrically opposed to the interface; and
   a fastening means for coupling the ends of the first and second panels to each other when the band is disposed in a substantially circular configuration,
   wherein the band has a predetermined longitudinal length, thickness and material strength, and the fastening means is adjustable for applying a predetermined radial loading to a substantially circular portion of an external store disposed in relation to the hanger assembly so that the band substantially encircles and contacts the circular portion of the external store to secure the external store to the hanger assembly, such that a maximum bending moment caused by loading on the hanger assembly with the external store secured thereto is located at a region of the band other than at the interface.

2. The hanger assembly of claim 1, wherein the band has a longitudinal length of between about 8 and 15 inches, where the maximum bending moment is located adjacent to an edge of the band.

3. The hanger assembly of claim 1, wherein the band has a longitudinal length of between about 8 and 15 inches.

4. The hanger assembly of claim 1, wherein the band has a thickness of between about 0.190 and 0.375 inches.

5. The hanger assembly of claim 1, wherein the band, the interface and the fastening means include high strength steel.

6. The hanger assembly of claim 1, wherein the center panel further defines an aperture extending from the outer surface to the inner surface of the center panel, wherein the aperture is of a predetermined cross-section sufficient for receiving therethrough a hardware interface for electrically interconnecting the external store secured by the band to the hanger assembly with the attachment mechanism of the aircraft to which the interface of the center panel is for engagement, wherein the maximum bending moment caused by loading on the hanger assembly with the external store secured thereto is located at a region of the band other than at the aperture.

7. The hanger assembly of claim 1, wherein the each of the arcuate side panels has a conformal profile.

8. A system for suspending an external store from an aircraft comprising:
   an aircraft including an attachment mechanism; and
   a hanger assembly coupled to an external store and the attachment mechanism, wherein the hangar assembly includes a band including an arcuate center panel having first and second ends and outer and inner arcuate surfaces, wherein the band further includes first and second arcuate side panels each having first and second ends, wherein the first end of the center panel is in hinged connection to the first end of the first side panel and the second end of the center panel is in hinged connection to the first end of the second panel, wherein the outer surface of the center panel includes an interface engaged with the attachment mechanism of the aircraft, wherein the side panels are rotatable at the hinged connection to place the band in a substantially circular configuration where the second ends of the first and second panels face each other and are substantially diametrically opposed to the interface; and
   a fastening means for coupling the ends of the first and second panels to each other when the band is disposed in a substantially circular configuration,
   wherein the band has a predetermined longitudinal length, thickness and material strength, and the fastening means is adjustable for applying a predetermined radial loading to a substantially circular portion of the external store disposed in relation to the hanger assembly so that the band substantially encircles and contacts the circular portion of the external store to secure the external store to the hanger assembly, such that a maximum bending moment caused by loading on the hanger assembly with the external store secured thereto is located at a region of the band other than at the interface.

9. The system of claim 8, wherein the center panel further defines an aperture extending from the outer surface to the inner surface of the center panel, wherein the aperture is of a predetermined cross-section sufficient for receiving therethrough a hardware interface for electrically interconnecting the external store with the aircraft, wherein the maximum bending moment caused by loading on the hanger assembly with the external store secured thereto is located at a region of the band other than at the aperture.

* * * * *